March 10, 1964     T. R. ALLEY     3,124,150
GAS LIFT VALVE
Filed June 8, 1961     2 Sheets-Sheet 2
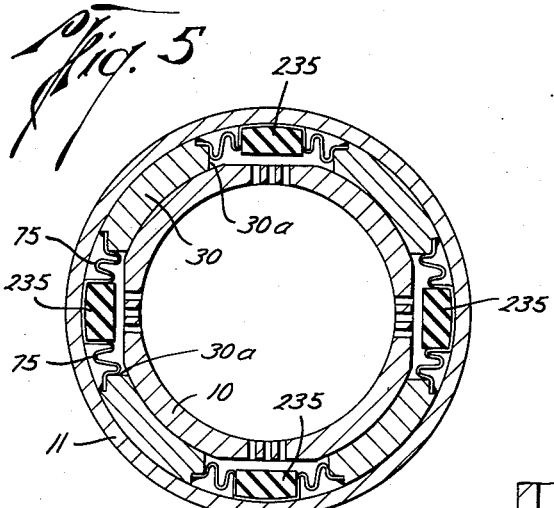
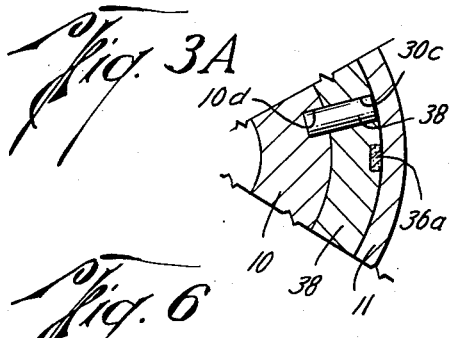
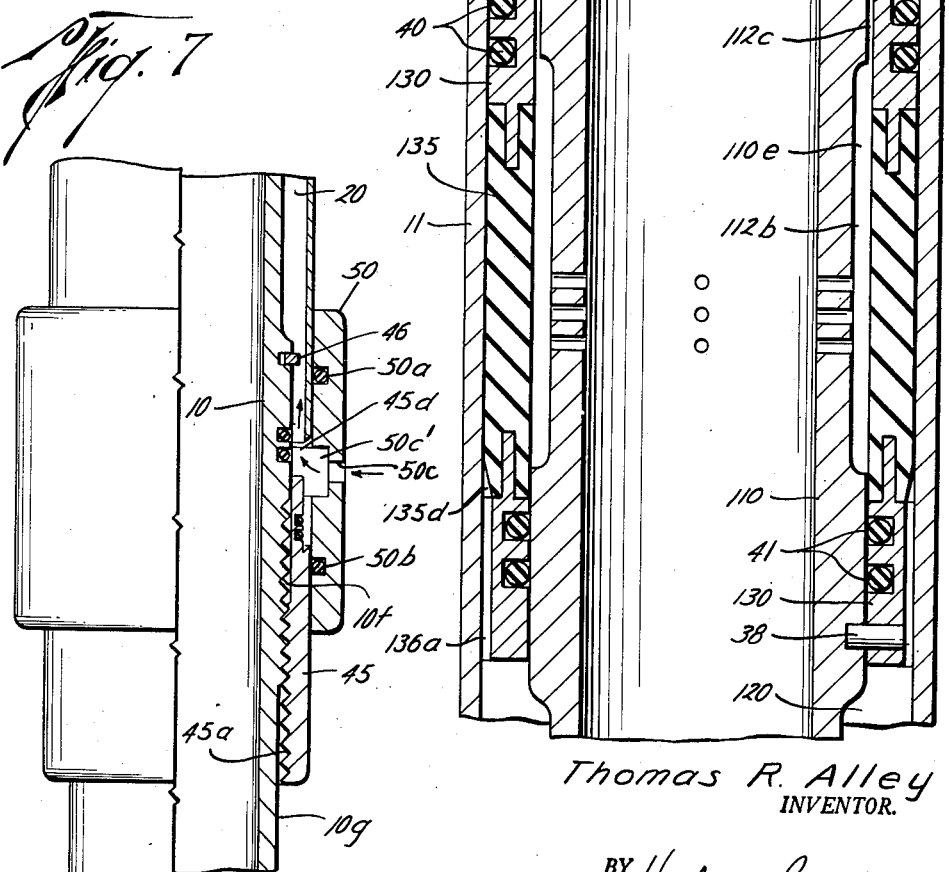
Thomas R. Alley
INVENTOR.
BY Hayden & Pravel
ATTORNEYS

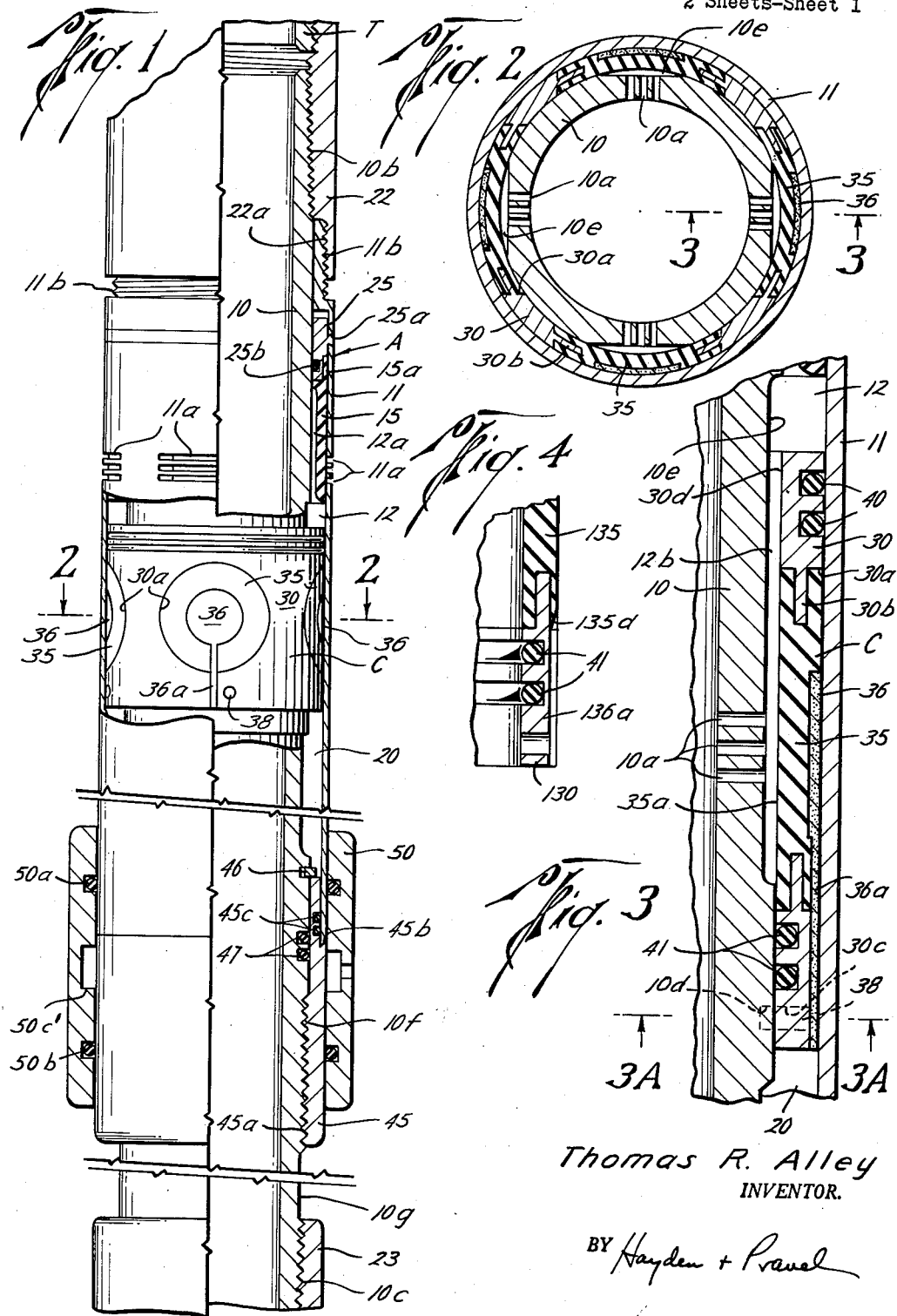

United States Patent Office 3,124,150
Patented Mar. 10, 1964

3,124,150
GAS LIFT VALVE
Thomas R. Alley, 341 Erin St., Houston 22, Tex.
Filed June 8, 1961, Ser. No. 126,399
5 Claims. (Cl. 137—155)

This invention relates to new and useful improvements in gas lift valves.

As is well known, gas lift valves have been used in connection with the production of oil through tubing strings by the injection of gas under pressure from the casing annulus into the tubing string. Gas lift valves are ordinarily located at longitudinally spaced points on the tubing string for the gas injection to various levels, depending upon the level of the oil or working fluid in the tubing. Various types of gas lift valves are known, one type of which has an annular flexible control sleeve mounted in a tubing in conjunction with a check valve which prevents any fluid back-pressure in the tubing from reaching the control valve. Because the tubing back-pressure is cut off from such sleeve-type valve, it is necessary to successively lower the injection gas pressure in the annulus in order to close each successively lower valve as the level of the oil or working fluid in the tubing drops. Such prior sleeve-type construction is particularly undesirable in operations in which a constant flow of the injected gas into the tubing is desired.

It is therefore one object of this invention to provide a new and improved gas lift valve which utilizes the back-pressure of fluid in the tubing in conjunction with gas pressure from the casing annulus for the opening of the valve.

Another important object of this invention is to provide a new and improved gas lift valve having a rigid annular valve cage adapted to be mounted on a tubular body connected in a tubing string, wherein the cage has one or more valve diaphragms mounted therewith for controlling fluid flow through ports in the tubular body for thereby controlling the injection of gas into the tubing string for lifting oil or other fluid.

Still another object of this invention is to provide a new and improved gas lift valve which is adapted to be mounted in a well pipe and which has a control valve and a check valve, and wherein the check valve admits gas under pressure from the exterior of the well pipe to exert an opening force on the control valve to open same and admit the gas pressure to the interior of the well pipe for lifting oil or other fluid therein.

A further object of this invention is to provide a new and improved gas lift valve having an inner mandrel forming a continuation of a tubing string and an outer tubular body forming an annular chamber therebetween, wherein a cylindrical valve cage having a plurality of circumferentially spaced diaphragms is coaxially positioned in the annular chamber for controlling the injection of gas from the exterior of said valve to the interior of said tubing string, and wherein one end of said valve cage has a wall thickness equal to the width of said annular chamber to form a closure for one end of said chamber.

Another object of this invention is to provide a new and improved gas lift valve having an annular pressure chamber formed by concentric tubular members, which chamber is adapted to be filled with gas under pressure by longitudinally moving a part of one of said tubular members to provide an opening into said chamber in alignment with an annular pressure charging sleeve adapted to be used for introducing gas under pressure into said chamber through said opening.

A particular object of this invention is to provide a new and improved gas lift valve adapted to be connected in a tubing string so as to form a continuation thereof and without extending laterally therefrom, wherein said valve has a choke means therewith for reducing gas pressure as it flows from exteriorly of the tubing string through said valve to the interior thereof to provide for constant gas lifting of the oil or other liquid in the tubing string.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section, illustrating one form of the gas lift valve of this invention;

FIG. 2 is a horizontal cross-sectional view taken on line 2—2 of FIG. 1;

FIG. 3 is a vertical sectional view of a portion of the form of the invention shown in FIG. 1, such view being enlarged as compared to the illustration in FIG. 1;

FIG. 3A is a horizontal cross-sectional view taken on line 3A—3A of FIG. 3;

FIG. 4 is a fragmentary sectional view illustrating a modified form of the valve of this invention;

FIG. 5 is a horizontal cross-sectional view similar to FIG. 2, but illustrating a modified form of the invention;

FIG. 6 is a vertical sectional view of a portion of another modified form of the gas lift valve of this invention; and FIG. 7 is a view, partly in elevation and partly in section, illustrating the structure of the gas lift valve which is particularly adapted for the charging of the pressure charged chamber of the valve.

In the drawings, the letter A designates generally the gas lift valve of this invention which is adapted to be mounted in a well pipe or tubing string T, the lower end of which is illustrated in FIG. 1. Although not shown, the well pipe or tubing string would of course extend below the gas lift valve A in the usual case. Normally, a plurality of the gas lift valves A are located in the well pipe or tubing string T at different elevations for lifting the oil or other working fluid within the tubing T upwardly when such oil or working fluid is at different levels. Briefly, the gas lift valve A of this invention includes an inner mandrel 10 and an outer tubular body 11 with an annular space or chamber 12 formed therebetween. The outer tubular body 11 is provided with openings 11a for admitting fluid from the exterior of the gas lift valve A to the chamber 12. A check valve 15 permits the entry of the gas from the area exteriorly of the gas lift valve A into the chamber 12, but prevents the flow of fluid outwardly from the chamber 12 through the openings or holes 11a. The mandrel 10 has a plurality of inlet ports 10a through which fluid is adapted to flow between the chamber 12 and the interior of the mandrel 10. A control valve C is mounted in the chamber 12 for controlling the flow of the gas in the chamber 12 through the ports 10a. A predetermined pressure from a gas in a pressure charged section or chamber 20 acts on the outward side of the control valve C to close the flow through the ports 10a when the pressure in the chamber or section 20 is in excess of the fluid pressure in the chamber 12. When the pressure inwardly of the control valve C is in excess of the predetermined charged pressure in the chamber 20, then the valve C opens. With the construction of this invention, the gas lift valve is acted upon by the liquid or working fluid within the mandrel 10 as well as the gas or fluid introduced into the chamber 12 from the casing annulus exteriorly of the body 11. As will be more fully explained, such feature of this invention is of particular importance since it eliminates the necessity for lowering the gas pressure exteriorly of the valve or valves A when the level of the oil or working fluid in the tubing drops. Thus, with the present invention, full injection gas pressure is available down to the lowest gas lift valve A in a particular well pipe or tubing string since such lowest valve remains open for a continuous flow as long as a predetermined volume of gas is injected into the casing externally of the tubing string. The valves A above the lowest valve close successively as the working fluid level drops without changing the injection gas pressure. It will be appreciated that the casing is not illustrated in the drawings since it is conventional to introduce gas under pressure into a tubing string from a casing annulus between the tubing string and the casing for the gas lifting of oil or other liquid in the tubing.

Considering the invention more in detail, and referring in particular to the form of the invention illustrated in FIGS. 1–3, the mandrel 10 is provided with external upper threads 10b which are in threaded engagement with a collar 22. The collar 22 is also in threaded engagement with the lower end of the tubing string T which is above the gas lift valve A. The lower end of the mandrel 10 is also provided with threads 10c which are in threaded engagement with a collar 23 which serves to connect the lower end of the mandrel 10 to the portion of the tubing string below the gas lift valve A.

The body 11 is provided with external upper threads 11b which are in threaded engagement with threads 22a formed on a lower extension of the collar 22. A packing ring 25 is welded or otherwise secured at 25a to the body 11. Such packing ring 25 is located above the inlet fluid ports 11a in the housing 11 and it has a seal ring 25b, which is preferably an O-ring formed of rubber or similar material, in sealing engagement with the external surface of the mandrel 10. Also, the ring 25 serves to hold the upper end 15a of the check valve 15 in position between in ring 25 and the body 11.

As best seen in FIG. 1, the check valve 15 extends downwardly from the packing ring 25 so that its lower end is free to move inwardly away from its closing contact with the ports or openings 11a. There is an annular space 12a inwardly of the check valve 15 to permit the lower portion of the check valve 15 to move inwardly. It is preferable to form the check valve 15 of rubber or some other similar resilient elastic material.

Below the check valve 15, in the chamber 12, the control valve C is formed with an annular rigid cage 30 which is provided with a plurality of circumferentially spaced openings 30a. A retaining flange 30b extends inwardly from the outer edge of each opening 30a. Such flange 30b may be a continuous annular flange or it may be formed in sections such as ribs. In any event, the flange 30b serves as a retaining means for a flexible diaphragm 35 mounted in each of the openings 30a. The diaphragms 35 are preferably formed of rubber, plastic or similar resilient material. In the form of the invention shown in FIGS. 1–3, a sintered metal section 36 is attached to the external surface of each of the flexible diaphragms 35. Such sintered metal is porous and therefore, although sintered metal is preferred, other porous materials may be utilized in place of the sintered metal. The central section 36 of the porous sintered metal is connected with a channel strip 36a which is also of sintered metal or other similar porous material and which extends downwardly on the external surface of the lower portion of the valve cage 30 so as to establish fluid communication from the pressure charged chamber 20 to the external surface of each of the diaphragms 35.

The valve cage 30 is attached to the mandrel 10 by anchoring pins 38 (see FIG. 3A) which extend through an opening 30c in the valve cage 30 into a recess 10d in the mandrel 10. It is also to be noted that the valve cage and the diaphragms 35 are of substantially the same thickness throughout which facilitates the mounting of the valve cage on the mandrel 10 in the position shown.

The pins 38 are preferably removable so that the cage 30 may be released from the mandrel 10 for replacement or repair.

The mandrel 10 is formed with recesses 10e in an area extending above and below the ports 10a. The control valve C is positioned outwardly of such recesses 10e and the space between the lower or inner surface of each recess 10e and the inner wall 30d of the valve cage 30 and the inner wall 35a of each of the diaphragms 35 provides for a channel 12b inwardly of each of the diaphragms 35 for directing fluid as it flows from the upper portion of the chamber 12 to and through the ports 10a. Fluid seals 40 such as the O-rings illustrated in the drawings are preferably positioned on the external surface at the upper end of the valve cage 30 for preventing fluid from flowing downwardly or upwardly past such seals 40. Such seals 40 constitute the upper end of the lower pressure charged chamber 20 since it is possible for the gas under pressure in the chamber 20 to communicate up to such seals 40.

On the lower internal surface of the valve cage 30, seal rings 41 are provided for sealing contact between the valve cage 30 and the external surface of the mandrel 10. Such seal rings 41 are also preferably O-rings of rubber or similar material and they actually constitute the lower end of the chamber 12, since the fluid in the chamber 12 may pass downwardly to such seals 41 but is prevented from passing therebelow because of such seals 41.

The pressure charged chamber 20 may be considered as a separate chamber or as a section of the chamber 12 which is sealed off therefrom by the seals 40 and 41 as previously explained. The lower end of the chamber 20 is closed by a closure sleeve 45 which has internal threads 45a in threaded engagement with external threads 10f on the mandrel 10. The closure 45 is therefore longitudinally movable with respect to the mandrel 10 and the body 11. When the closure 45 is in its normal closed position, it is in contact with a stop snap-ring 46 mounted on the mandrel 10. Also, a tapered edge 45b of the closure 45 is in engagement with a correspondingly tapered surface at the end of the body 11. The closure 45 carries O-rings 45c or other suitable means for providing a seal between the closure 45 and the body 11. Also, suitable seal rings 47 are mounted on the mandrel 10 for sealing engagement with the inside surface of the closure 45.

The closure 45 is in the position shown in FIG. 1 during normal operations when a pressure charge of gas or similar fluid has been provided in the chamber 20. When the charging of the chamber 20 takes place, the closure 45 is adapted to be moved longitudinally downwardly to the position shown in FIG. 7 for providing an opening 45d into the chamber 20. For facilitating the introduction of the gas pressure into the chamber 20, a removable sliding seal sleeve 50 is preferably used as particularly illustrated in FIG. 7. Such sleeve 50 has upper and lower seals 50a and 50b which extend annularly and which seal with the body 11 and the closure 45, respectively, above and below the opening 45d. An inlet opening 50c is provided for receiving a pressure fitting from a source of gas under pressure. Such opening 50c is preferably in communication with an annular groove or opening 50c' which discharges into the opening 45d for introducing the gas under pressure into the chamber 20.

After the chamber 20 is charged to the predetermined pressure for the particular valve A, then the closure sleeve 45 is threaded upwardly to the position shown in FIG. 1 so that the lower end of the chamber 20 is completely closed. Thereafter, the sleeve 50 is either removed by longitudinally sliding it downwardly to a point at which the tubing is broken, or it is left in position if it does not interfere with the particular operations being employed. It is to be noted that there is a longitudinal annular section 10g between the lower end of the closure 45 and the upper end of the collar 23 for the positioning of tongs for the purpose of mounting the gas lift valve A in the tubing string. Also, such area 10g of the mandrel 10 may be gripped with the tongs in the unthreading and rethreading of the closure 45 on the mandrel 10.

In the operation or use of the gas lift valve A of this invention, the chamber 20 is charged with a gas under pressure to a predetermined amount which will be the setting for the gas lift valve A. If a sequence or series of longitudinally positioned gas lift valves are used, as is customary in the gas lift art, then the lowest valve A is charged with the greatest pressure in the chamber 20 and the valves upwardly therefrom have successively lower pressure charges.

Considering the action of each of the valves A, when the pressure of the gas in the casing annulus exteriorly of the tubing string T acts against the check valve 15, it moves the check valve 15 inwardly and allows the gas to enter the chamber 12. The gas under pressure in the chamber 12 flows through the channel or groove 12b adjacent to the inward surface of each of the diaphragms 35. The fluid such as the oil or other working fluid within the tubing T also exerts a pressure outwardly on the diaphragm 35, depending upon the head or level of the oil or working fluid within the tubing T. Thus, there is a combined liquid and gas pressure acting on the inner surface of each of the diaphragms 35 tending to open them or move them to an open position so that the gas under pressure may flow from the chamber 12 through the ports 10a into the inside of the mandrel 10. The pressure in the charged chamber 20, on the other hand, is acting on the outer surface of each of the diaphragms 35 tending to push each of them inwardly to a closed position covering the ports 10a. Therefore, when the pressure of the gas in the charged section or chamber 20 exceeds the pressure of the gas in the chamber 12 and the head of the liquid in the mandrel 10 acting on the particular diaphragm or diaphragms 35, the diaphragms 35 are in the closed position sealing off the ports 10a. When the gas pressure in the chamber 12 plus the head of liquid in the tubing 10 above the ports 10a exceeds the pressure of the gas in the charged chamber 20, then the diaphragms 35 are moved to the position shown in FIG. 3 so that the channel 12b is open and the gas under pressure flows from the casing annulus into the interior of the tubing for applying the lifting force to the liquid or oil thereabove. The charge of the gas serves to lift the oil to the surface of the well in the known manner after it has been injected.

The form of the invention illustrated in FIGS. 1-3 is known as an intermitter type of valve since the gas is intermittently caused to flow into the tubing string from the casing annulus. However, if it is desired to provide for the constant flow of the casing gas into the tubing string, the mandrel 10 may be provided with shortened recesses 110e so as to provide a reduced annular space 112c at the upper end of the valve cage 130. The reduced annular portion or space 112c is provided for serving as an orifice or choke means which reduces the pressure of the gas flowing into the annular space 112b from the chamber 112 thereabove. This form of the invention is shown in FIG. 6 and is particularly desirable for a constant flow work, as previously pointed out.

It is important to note that with the construction illustrated in FIG. 6, the full available injection gas pressure is made available down to the lowest valve in a series of the valves in the tubing string. This is made possible because the lowest valve in the tubing string is opened by the greatest opening pressure as compared to the valves thereabove. Thus, since the head of the liquid in the tubing string is also acting on the gas lift valves, the lowest valve in a series of longitudinally spaced valves in the tubing string is subjected to the casing gas pressure plus the head of liquid acting thereon. Therefore, the lowest valve is always subject to a higher pressure in the present invention since the back-pressure or liquid pressure of the oil is operating in conjunction with the casing gas pressure to tend to open each of the gas lift valves. Therefore, the gas pressure in the casing annulus may be maintained at a constant value while maintaining a constant flow through the various gas lift valves A right down to the lowest valve even though the level of the oil or working fluid drops or increases. Continuous injection of the gas under pressure is therefore maintained even though the level of the liquid drops down to such an extent that only the lowest valve is open and so long as a predetermined volume of the gas is injected into the casing.

It should also be noted in connection with FIG. 6, as well as FIG. 4, that the diaphragms 35 may be further modified as indicated by the diaphragms 135 which are formed completely of rubber or other resilient material. The valve cage 130 is the same as the valve cage 30, except that the lower portion of the valve cage 130 is provided with longitudinal grooves 136a which are in alignment with tapered notches 135d in the diaphragms 135 to establish fluid communication from the chamber 120 to the area externally of the diaphragms 135. The sintered metal 36 and the sintered metal channel 36a for each of the diaphragms 35 is thus omitted from the form of the invention shown in FIGS. 4 and 6. The other parts of the valve A shown in FIGS. 4 and 6 which correspond with the parts shown in FIGS. 1-3 bear like numerals. The operation of the form of the invention shown in FIGS. 4 and 6 is of course the same as previously explained, except for the choke means 112c which was described above. The choke means 112c may be omitted and the same type of full open channel 112b all of the way to the top of the valve cage 130 may be provided in the form of the invention shown in FIG. 6 if desired.

Another modification of the invention is illustrated in FIG. 5. In FIG. 5, all of the parts which correspond with the parts illustrated in FIGS. 1-3 bear like numerals. The diaphragms 235 are similar to the diaphragms 35 in that they are preferably formed of rubber, but they are mounted on resilient corrugated metal attaching strips or bands 75 instead of being molded or otherwise attached to the valve cage 30. Such attaching members 75 are formed of metal such as steel or other resilient metal which may be molded or otherwise attached to the diaphragms 235. The ends of the attaching member 75 which extend outwardly from the diaphragms 235 are soldered or are otherwise secured to the valve cage 30 so as to completely seal off each of the openings 30a in the valve 30. Although the diaphragms 235 are preferably formed of rubber, they may be formed of a more rigid material if desired due to the fact that the metal attaching strips 75 are resilient and permit the inward and outward movement of the diaphragms 235 as they are subjected to varying differential pressures thereacross. The operation of the form of the invention shown in FIG. 5 would of course be identical to that described heretofore in connection with FIGS. 1-3.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A gas lift valve adapted to be mounted in a pipe string, comprising a mandrel adapted to form a continuation of the pipe string, a tubular body surrounding said mandrel and annually spaced from said mandrel to form an annular chamber between said mandrel and said body, means for sealing off the upper and lower ends of said chamber, said mandrel having a plurality of circumferentially spaced flow ports therethrough, a rigid annular cage in said chamber, a plurality of circumferentially spaced flexible diaphragms mounted with said cage for sealing off against a mandrel port opposite thereto said diaphragms being exposed to fluid pressure in said mandrel, said tubular body having a fluid inlet opening to said chamber, said valve cage and diaphragms being spaced outwardly from said mandrel at one end for admitting gas inwardly of said diaphragm from said chamber, and means for sealing off a portion of said chamber on the other side of said valve cage from said body fluid inlet opening for providing a pressure charged space in fluid communication with the area outwardly of said diaphragms which acts to urge said diaphragms against said ports in said mandrel opposite said diaphragms when the pressure in the pressure charged space exceeds the fluid pressure inwardly of said diaphragm.

2. A gas lift valve comprising,
 (a) a mandrel,
 (b) an outer tubular body mounted on said mandrel forming a space therebetween,
 (c) circumferentially spaced port means in said mandrel,
 (d) circumferentially spaced diaphragm means opposite said spaced port means,
 (e) means supporting said diaphragm means for contacting against said port means opposite thereto to close said port means,
 (f) said mandrel and body forming a chamber to receive a pressure charge for urging said diaphragm means against said port means, and
 (g) port means in said body for conducting fluid from the exterior of said body to act on said diaphragm means to aid in moving said diaphragm means away from said port means and thereby communicate said body port means and mandrel port means.

3. A gas lift valve comprising,
 (a) a mandrel,
 (b) a tubular body mounted on said mandrel with a space therebetween,
 (c) said mandrel and said body having port means for fluid flow from the exterior of said body to the interior of said mandrel when said mandrel and body port means are in communication,
 (d) circumferentially spaced flexible diaphragm means for contacting against said mandrel port means to close off flow between said mandrel port means and body port means,
 (e) means sealing off a portion of said space for receiving a pressure charge therein, and
 (f) means communicating the pressure charge to normally urge said diaphragm means against said mandrel port means to close off communication with said body port means.

4. A gas lift valve comprising,
 (a) a mandrel,
 (b) an outer tubular body mounted on said mandrel with a space therebetween,
 (c) said mandrel and said body having port means for fluid flow from the exterior of said body to the interior of said mandrel when said mandrel and body port means are in communication,
 (d) a rigid cage positioned in said space,
 (e) flexible diaphragm means mounted on said cage opposite said mandrel port means and movable against said mandrel port means and away from said mandrel port means to control the flow of fluid from said body port means through said mandrel port means,
 (f) means sealing off a portion of said space for receiving a pressure charge therein, and
 (g) means communicating the pressure charge to normally urge said diaphragm means against said mandrel port means to close off communication with said body port means.

5. A gas lift valve comprising,
 (a) a mandrel,
 (b) an outer tubular body mounted on said mandrel,
 (c) said mandrel and said body having port means for fluid flow from the exterior of said body to the interior of said mandrel when said mandrel and body port means are in communication,
 (d) a rigid cage,
 (e) means securing said cage in a predetermined position in said body,
 (f) flexible diaphragm means mounted on said cage opposite said mandrel port means and movable against said mandrel port means and away from said mandrel port means to control the flow of fluid from said body port means through said mandrel port means,
 (g) means sealing off a space in said body for receiving a pressure charge therein, and
 (h) means communicating the pressure charge to normally urge said diaphragm means against said mandrel port means to close off communication with said body port means.

References Cited in the file of this patent
UNITED STATES PATENTS

| | | |
|---|---|---|
| 2,631,000 | Lee | Mar. 10, 1953 |
| 2,642,889 | Cummings | June 23, 1953 |
| 2,731,977 | McGowen | Jan. 24, 1956 |
| 2,747,608 | Grove | May 27, 1956 |
| 2,818,880 | Ratelband | Jan. 7, 1958 |
| 2,877,791 | Rich | Mar. 17, 1959 |
| 3,045,759 | Garrett | July 24, 1962 |